(12) United States Patent
Lokhande et al.

(10) Patent No.: US 12,468,989 B2
(45) Date of Patent: Nov. 11, 2025

(54) SYSTEM AND METHOD FOR FLEXIBILITY BASED PROFIT ALLOCATION FOR AGGREGATOR WITH DISTRIBUTED ENERGY RESOURCES

(71) Applicant: TATA CONSULTANCY SERVICES LIMITED, Mumbai (IN)

(72) Inventors: Smita Sanjay Lokhande, Mumbai (IN); Yogesh Kumar Bichpuriya, Pune (IN); Venkatesh Sarangan, Chennai (IN); Narayanan Rajagopal, Karnataka (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1 day.

(21) Appl. No.: 18/793,264

(22) Filed: Aug. 2, 2024

(65) Prior Publication Data

US 2025/0077991 A1    Mar. 6, 2025

(30) Foreign Application Priority Data

Aug. 28, 2023  (IN) .............................. 202321057637

(51) Int. Cl.
*G06Q 10/0631* (2023.01)
*H02J 3/38* (2006.01)

(52) U.S. Cl.
CPC ............ *G06Q 10/0631* (2013.01); *H02J 3/38* (2013.01); *H02J 2300/24* (2020.01)

(58) Field of Classification Search
CPC .... G06Q 50/06; G06Q 20/065; G06Q 20/381; G06Q 30/0206; G06Q 30/018; G06Q 2220/00; G05B 13/027; G05B 13/041
USPC .............................................................. 705/7
See application file for complete search history.

(56) References Cited

U.S. PATENT DOCUMENTS

| 8,260,468 | B2 * | 9/2012 | Ippolito ................. G06Q 50/06 700/297 |
| 2013/0046668 | A1 | 2/2013 | AlFaruque et al. |
| 2015/0288746 | A1 | 10/2015 | Clarke et al. |
| 2019/0020220 | A1 * | 1/2019 | Lian ........................ H02J 13/00 |

OTHER PUBLICATIONS

"Modelling and Characterisation of Flexibility From Distributed Energy Resources" Published by IEEE (Year: 2022).*

(Continued)

*Primary Examiner* — Zeina Elchanti
(74) *Attorney, Agent, or Firm* — Finnegan, Henderson, Farabow, Garrett & Dunner LLP

(57) ABSTRACT

This disclosure provides a system and method for flexibility based profit allocation for aggregator with distributed energy resources (DERs). The method of the present disclosure considers an aggregation model that allows an aggregator to orchestrate a set of heterogeneous DERs while enabling energy exchange among subscribed DERs and to participate in a day-ahead market. Further, a flexibility index is used to quantify the flexibility offered by a DER and a novel profit allocation model is proposed based on the flexibility index. Efficacy of the proposed models is demonstrated by evaluating their performance on a group of heterogeneous DERs using data traces from real-world electricity market.

12 Claims, 8 Drawing Sheets

(56) References Cited

OTHER PUBLICATIONS

Author: Jianxiao Wang, Haiwang Zhong, Junjie Qin [et. al] Title: Incentive Mechanism for Sharing Distributed Energy Resources Title of the item: Journal of Modern Power Systems and Clean Energy Date: 2019 vol. 7; Issue: 3.

Author: Freddy Plaum, Roya Ahmadiahangar, Argo Rosin, and Jako Kilter Title: Aggregated demand-side energy flexibility: A comprehensive review on characterization, forecasting and market prospects Title of the item: Energy Reports Date: 2022.

Author: Cherrelle Eid, Paul Codani, Yannick Perez [et. al] Title: Managing electric flexibility from Distributed Energy Resources: A review of incentives for market design Title of the item: Renewable and Sustainable Energy Reviews Date: 2016 vol. 64.

* cited by examiner

SYSTEM AND METHOD FOR FLEXIBILITY BASED PROFIT ALLOCATION FOR AGGREGATOR WITH DISTRIBUTED ENERGY RESOURCES

PRIORITY CLAIM

This U.S. patent application claims priority under 35 U.S.C. § 119 to: Indian patent application Ser. No. 202321057637, filed on 28 Aug. 2023. The entire contents of the aforementioned application are incorporated herein by reference.

TECHNICAL FIELD

The disclosure herein generally relates to the field of energy resources, and, more particularly, to system and method for flexibility based profit allocation for aggregator with distributed energy resources.

BACKGROUND

With evolution in power technology, sustainability targets are encouraging for higher penetration of distributed energy resources (DERs) such as solar photovoltaic (PV), wind power, electric vehicles, energy storage systems and flexible demand. Aggregators are expected to play a vital role in the utilization of distributed energy resources (DERs) in the smart grids. An aggregator's task is to coordinate the DERs to trade or to provide services to a power system through appropriate markets. They also create private value by allowing their subscribers to earn revenue through market participation as it is economically inefficient for DERs to participate individually in markets by themselves due to the high transaction costs and low individual capacities. Due to increased demand for aggregation, there exists conventional methods that incorporate need and functions of aggregators. One such conventional method identifies barriers faced by aggregators in current market scenario and proposes a policy review for European markets to enable aggregation. Various techniques for aggregating loads and applicability of aggregators in the evolving smart grid is discussed in multiple existing works. Some of the existing methods on aggregation consider participation in day-ahead markets alone while few others consider participation in multiple markets such as energy, regulation and reserve market.

Aggregators are capable of creating permanent fundamental value for the subscribers in terms of economies of scale and scope which is independent of the regulation framework. Thus, in turn, encourages competition and innovation which enable better products. In this context, apart from orchestrating and scheduling the DERs, another key task of an aggregator is to distribute the resulting profit among its subscribers. This profit distribution is expected to value the contribution of each subscriber in a fair manner.

There exists a profit allocation mechanism satisfying all the basic requirements of an ideal allocation where models for profit sharing among DERs under an aggregator using concepts from cooperative game theory have also been provided. However, in conventional methods of profit allocations, the share of profit allocated to a particular subscriber can vary considerably across days even though the subscribers set may remain unchanged. Consequently, from received profits, it is difficult for the subscribers to decipher what kind of behavior helps the grid and act accordingly. Also, with conventional profit allocation methods, it can be computationally expensive to determine the profit allocations, especially when there are hundreds of DERs and dozens of transactions encompassing all the DERs have to be completed in a day.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising inputting, via one or more hardware processors, (i) a first set of information pertaining to a plurality of distributed energy resource (DER) assets of one or more subscribers S, and (ii) a second set of information related to trading and allocation to an aggregator model; determining, via the one or more hardware processors, an optimal value of an aggregator profit in accordance with an objective function of the aggregator model such that an energy sharing by the plurality of distributed energy resource (DER) assets within a pool of the aggregator model is ensured; computing, via the one or more hardware processors, a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and allocating, via the one or more hardware processors, the optimal value of aggregator profit to the one or more subscribers S based on the computed flexibility index.

In another aspect, a system is provided. The system comprising a memory storing instructions; one or more communication interfaces; and one or more hardware processors coupled to the memory via the one or more communication interfaces, wherein the one or more hardware processors are configured by the instructions to: input (i) a first set of information pertaining to a plurality of distributed energy resource (DER) assets of one or more subscribers S, and (ii) a second set of information related to trading and allocation to an aggregator model; determine, an optimal value of an aggregator profit in accordance with an objective function of the aggregator model such that an energy sharing by the plurality of distributed energy resource (DER) assets within a pool of the aggregator model is ensured; compute, a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and allocate, the optimal value of aggregator profit to the one or more subscribers Sbased on the computed flexibility index.

In yet another aspect, a non-transitory computer readable medium is provided. The non-transitory computer readable medium are configured by instructions for inputting (i) a first set of information pertaining to a plurality of distributed energy resource (DER) assets of one or more subscribers S, and (ii) a second set of information related to trading and allocation to an aggregator model; determining, an optimal value of an aggregator profit in accordance with an objective function of the aggregator model such that an energy sharing by the plurality of distributed energy resource (DER) assets within a pool of the aggregator model is ensured; computing, a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and allocating, the optimal value of aggregator profit to the one or more subscribers S based on the computed flexibility index.

In accordance with an embodiment of the present disclosure, the objective function is represented as: max $r^m + r^p - \Sigma_{s \in S}(c_s^{Gen} - c_s^{deg})$, where $r^m$ represents revenue earned by the aggregator from a volume traded in market over an entire day, $r^p$ represents net revenue from trading within the pool, $c_s^{Gen}$ represents cost of generation and $c_s^{deg}$ represents degradation cost associated with a distributed energy resource (DER) assets from the plurality of distributed energy resource (DER) assets of a subscriber s from the one or more subscribers S.

In accordance with an embodiment of the present disclosure, the total flexible volume ($v_s^{flex}$) is represented as: $v_s^{flex} = w_b b_s^{flex} + w_d d_s^{flex} + w_g g_s^{flex}$, $\forall s \in S$, where $w_x$ is a weight associated with a flexibility component x such that $0 \leq w_x \leq 1$ and $\Sigma_x w_x = 1$ with $x \in \{w_b, w_d, w_g\}$, where $v_s^{flex}$ represents flexibility of a battery, $d_s^{flex}$ represents flexibility of demand, and $g_s^{flex}$ represents flexibility of solar.

In accordance with an embodiment of the present disclosure, the optimal value of allocated aggregator profit is represented as:

$$\prod_s^{alloc} = \prod_s + \frac{f_s}{\sum_{s \in S} f_s} \prod_A^+,$$

where $\Pi_s$ represents profit earned by the subscriber s from the one or more subscribers S while trading with the market individually, $f_s$ represents the flexibility index, and $\Pi_A^+$ represents surplus profit earned due to aggregation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
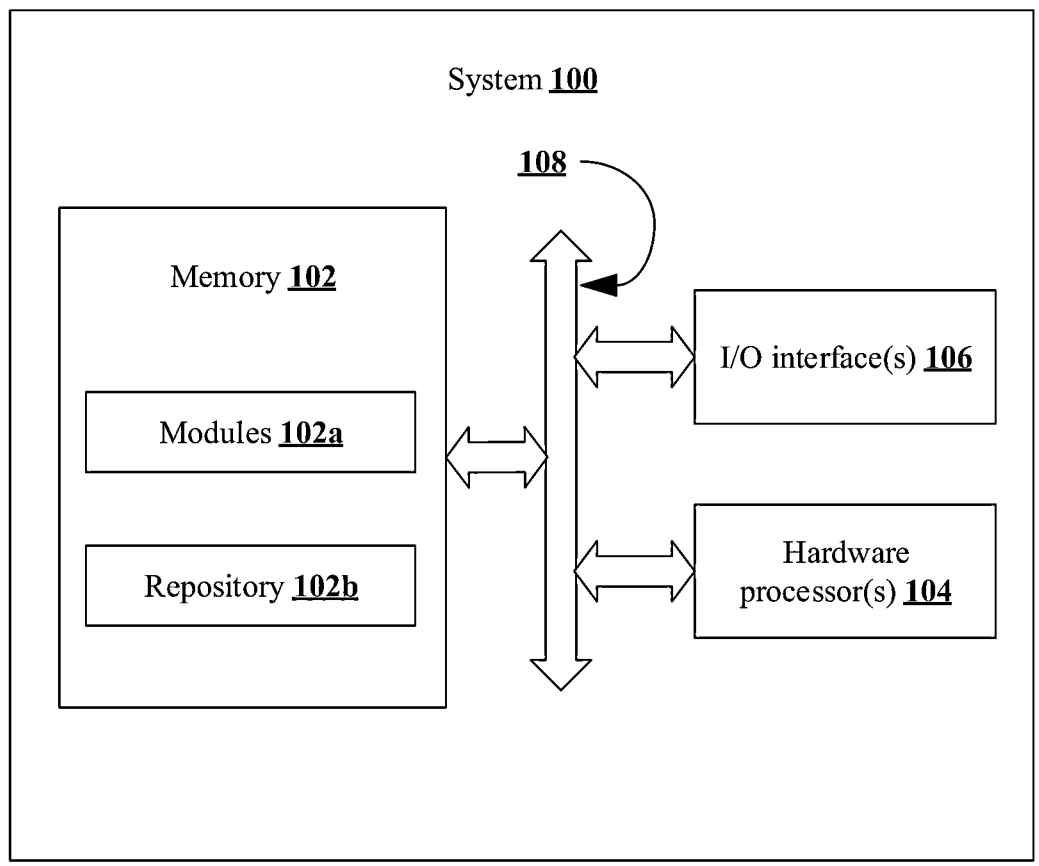
FIG. 1 illustrates an exemplary system for flexibility based profit allocation for aggregator with distributed energy resources, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Embodiments of the present disclosure provide a system and method for flexibility based profit allocation for aggregator with distributed energy resources. The method of the present disclosure considers an aggregation model that allows an aggregator to orchestrate a set of heterogeneous DERs while enabling energy exchange among subscribed DERs and to participate in a day-ahead market. Further, a flexibility index FlexI is used to quantify the flexibility offered by a DER and a novel profit allocation model is proposed based on the FlexI. Efficacy of the models implemented by the present disclosure is demonstrated by evaluating their performance on a group of heterogeneous DERs using data traces from real-world electricity market. More specifically, the present disclosure describes the following:

1. An aggregation model for DERs to participate in a day-ahead market which encourages energy sharing within DER pool as much as possible so as to avoid paying network charges and thus reduce the overhead for both buyers and sellers.
2. Defining a flexibility index FlexI to quantify the flexibility offered by a DER to an aggregator.
3. A profit allocation model based on the flexibility index of DERs to address the aggregator's ex-post problem of profit allocation among its subscribing DERs.

Referring now to the drawings, and more particularly to FIGS. 1 through 8B, where similar reference characters denote corresponding features consistently throughout the figures, there are shown preferred embodiments and these embodiments are described in the context of the following exemplary system and/or method.

FIG. 1 illustrates an exemplary system for flexibility based profit allocation for aggregator with distributed energy resources according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
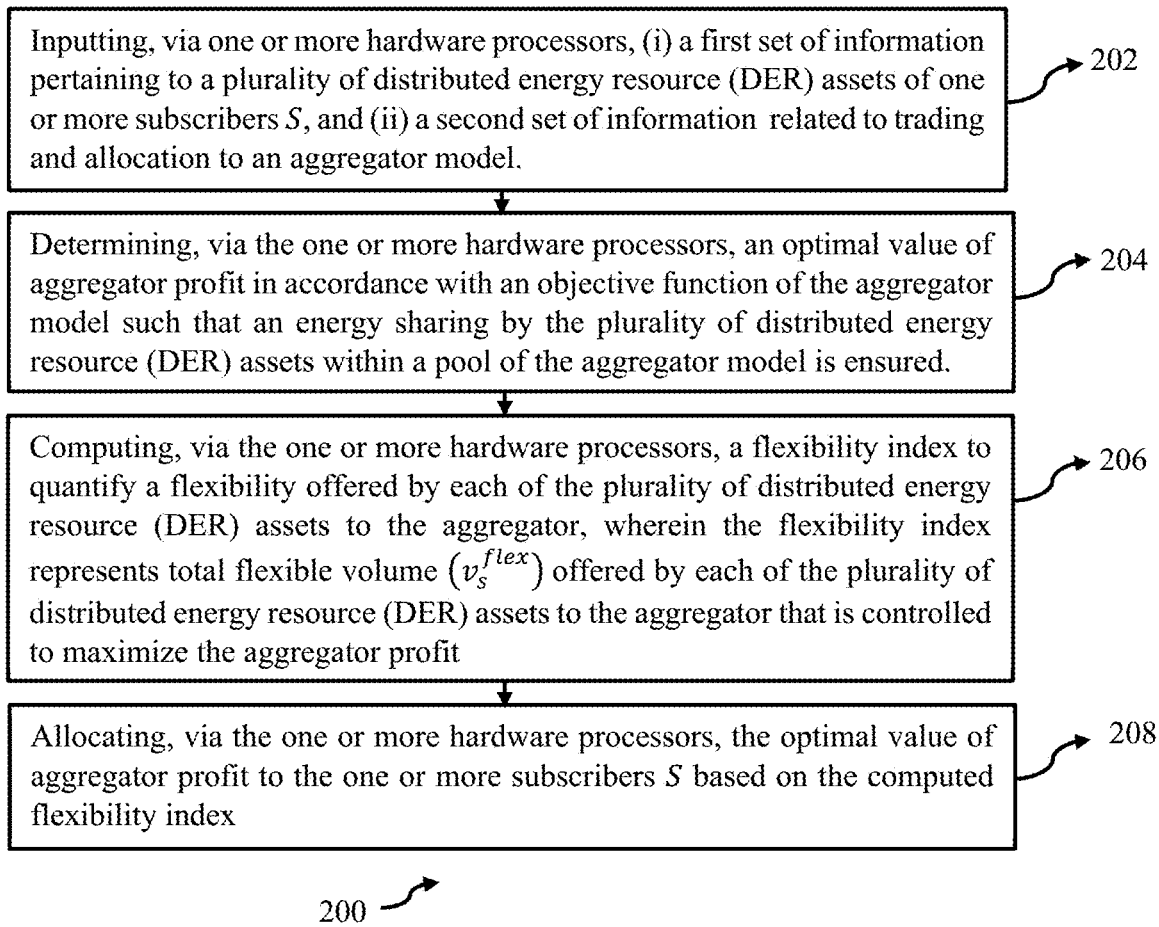
FIG. 2 illustrates an exemplary flow diagram illustrating a method for flexibility based profit allocation for aggregator with distributed energy resources, in accordance with some embodiments of the present disclosure.

FIG. 2, with reference to FIG. 1, illustrates an exemplary flow diagram illustrating a method for flexibility based profit allocation for aggregator with distributed energy resources, using the system of FIG. 1, in accordance with some embodiments of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram as depicted in FIG. 2, and one or more examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

In an embodiment, at step 202 of the present disclosure, the one or more hardware processors 104 are configured to input a first set of information pertaining to a plurality of distributed energy resource (DER) assets of one or more subscribers S, and (ii) a second set of information related to trading and allocation to an aggregator model. The first set of information may include but are not limited to DERs availability, specifications and constraints for next day, cost of electricity generation by DERs, Battery capacity, battery cost, and/or the like. The second set of information may include but are not limited to market demand, market type, market price, and/or the like.

Further, at step 204 of the present disclosure, the one or more hardware processors 104 are configured to determine an optimal value of an aggregator profit in accordance with an objective function of the aggregator model such that an energy sharing by the plurality of distributed energy resource (DER) assets within a pool of the aggregator model is ensured.

The steps 202 and 204 are better understood by way of the following description provided as exemplary explanation.

Figure 3:
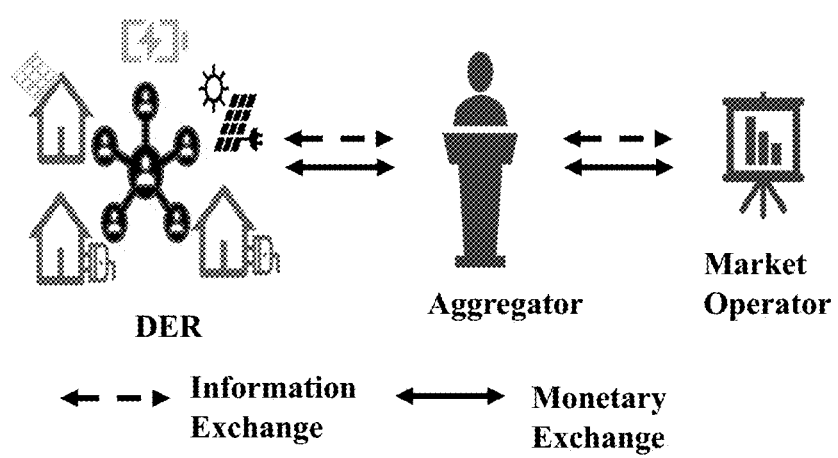
FIG. 3 shows an exemplary aggregator model for flexibility based profit allocation for aggregator with distributed energy resources, in accordance with some embodiments of the present disclosure.

For instance, S represents a set of all subscribers of an aggregator. In the context of the present disclosure, the set of all subscribers of the aggregator is referred as pool throughout the description. It is assumed that the subscribers share information required for trading and allocation. The aggregator accumulates the information about the DERs availability, specifications and constraints for next day and accordingly participates in day-head market as a price taker. It also tries to utilize available resources to meet demand within the pool thereby reducing the market transactions to save on the network costs. The aggregator maximizes its profit by trading and scheduling the DERs optimally. The earned profit is then shared with the participating DERs in proportion to the flexibility offered in the pool. FIG. 3 shows an exemplary aggregator model for flexibility based profit allocation for aggregator with distributed energy resources, in accordance with some embodiments of the present disclosure. The aggregator model enables (1) market participation and scheduling optimization, and (2) profit allocation.

A. Market Participation and DER Scheduling Optimization

Each DER type is given a choice to trade with both the market and within the pool. A generator (e.g., PV) can either sell its power in the market denoted by ($g_{t,s}^{mSell}$) or in the aggregator pool denoted by ($g_{t,s}^{pSell}$) as shown in equation (1) below:

$$g_{t,s}^{mSell} + g_{t,s}^{pSell} = G\hat{e}n_{t,s}, \quad (1)$$
$$\forall t \in \mathcal{T},$$
$$\forall s \in S$$

Here, $\mathcal{T}$ represents a set of time slots of the day over which the optimization is run.

The subscriber s can satisfy its fixed ($D_{t,s}^{fix}$) and flexible ($d_{t,s}^{flex}$) demand at time t by either buying from market ($d_{t,s}^{mBuy}$) or from the pool ($d_{t,s}^{pBuy}$) as shown in equation (2) below:

$$d_{t,s}^{mBuy} + d_{t,s}^{pBuy} = D_{t,s}^{fix} + d_{t,s}^{flex}, \quad (2)$$
$$\forall t \in \mathcal{T},$$
$$\forall s \in S$$

A battery of subscriber s can vary its state of charge (soc) at time t by either buying/charging from markets ($b_{t,s}^{mBuy}$) and pool ($b_{t,s}^{pBuy}$) or by selling/discharging in markets ($b_{t,s}^{mSell}$) and pool ($b_{t,s}^{pSell}$) as shown in equation (3) below:

$$soc_{t,s} = soc_{t-1,s} + \left(b_{t,s}^{mBuy} + b_{t,s}^{pBuy}\right)\eta_s^{chg} - \left(b_{t,s}^{mSell} + b_{t,s}^{pSell}\right)/\eta_s^{dsg}, \quad (3)$$
$$\forall t \in \mathcal{T},$$
$$\forall s \in S$$

Here, $\eta_s^{chg}$ ad $\eta_s^{dsg}$ represent battery's charging and discharging efficiency respectively.

Each DER has its own constraints which should be considered when determining their trading volumes. For battery, the state of charge (soc) should not exceed its maximum and minimum limits ($SoC_s^{max}$, $SoC_s^{min}$) which is ensured as provide in equation (4) below:

$$SoC_s^{min} \leq soc_{t,s} \leq SoC_s^{max}, \quad (4)$$
$$\forall t \in \mathcal{T},$$
$$\forall s \in S$$

Trading with markets and pool at time t can be enabled only when it is available and communicated by a binary parameter $a_{t,s}^b$. The volume of power it can trade at each time slot t cannot exceed its maximum charge/discharge rate $R_s^{max}$ as shown in below equations (5) and (6) respectively.

$$b_{t,s}^{mBuy} + b_{t,s}^{pBuy} \leq \alpha_{t,s}^b R_s^{max} z_{t,s} \quad (5)$$
$$\forall t \in \mathcal{T},$$
$$\forall s \in S$$

$$b_{t,s}^{mSell} + b_{t,s}^{pSell} \leq \alpha_{t,s}^b R_s^{max}(1 - z_{t,s}), \quad (6)$$
$$\forall t \in \mathcal{T},$$
$$\forall s \in S$$

Also, in a time slot t, it can either charge or discharge, but not both. This is enforced using binary variable $z_{t,s}$. Constraint shown in equation (7) below ensures that the SoC of each battery at start and end of the day is same.

$$soc_{T,s} = soc_{0,s} \quad (7)$$
$$\forall s \in S$$

For subscribers with demand, the flexible demand scheduled at time t must always be less than allowed maximum limit $D_{t,s}^{max/flex}$ as shown in equation (8) below:

$$0 \leq d_{t,s}^{flex} \leq D_{t,s}^{maxflex} a_{t,s}^d, \forall t \in \mathcal{T}, \forall s \in S \quad (8)$$

A binary parameter $a_{t,s}^d$ ensures that the flexible load is scheduled only in subscriber desired slots. The flexible demand scheduled over the entire day must be equal to the expected total flexible demand $D_{t,s}^{totflex}$ as shown in equation (9) below:

$$\sum_{t \in T} d_{t,s}^{flex} \leq D_{t,s}^{totflex} \forall s \in S \quad (9)$$

The energy sharing among DERs in the aggregator pool at each time t must always be balanced as shown in equation (10) below:

$$\sum_{s \in S} b_{t,s}^{pSell} + g_{t,s}^{pSell} = \sum_{s \in S} b_{t,s}^{pBuy} + d_{t,s}^{pBuy}, \forall t \in \mathcal{T} \quad (10)$$

Here, $g_{t,s}^{pSell}$ represents selling/discharging the solar in pool. Equation (11) shown below describes calculation of power $p_t^m$ (net generation/demand) traded with day-ahead market at t by the aggregator.

$$p_{t,s}^m = \sum_{s \in S} g_{t,s}^{mSell} + b_{t,s}^{mSell} - b_{t,s}^{mBuy} - d_{t,s}^{mBuy}, t \in \mathcal{T} \quad (11)$$

Here, $g_{t,s}^{mell}$ represents selling/discharging the solar in the market. The net revenue $r^m$ earned by the aggregator from the volume traded in day-ahead market over the entire day is shown in equation (12) below.

$$r^m = \sum_{t \in T} \hat{\lambda}_t \sum_{s \in S} p_{t,s}^m \delta t \quad (12)$$

Here, $\hat{\lambda}_t$ represents forecasted market price for that time slot and $\delta t$ represents time duration.

To encourage energy sharing between assets in the aggregator pool, pool prices re introduced in the present disclosure. The reason for pool pricing is that the cost of trading in pool should be better than cost of trading with market as it reduces net power exchange between the DER assets and market and thus saves on network charges NC. The subscribers selling in pool benefit as they can sell at a price which is effectively higher than what they would ultimately receive in the case of a market transaction due to absence of network usage charges. Similarly, the buyers too benefit as they can buy at a price which is effectively lower for them (without the network charges). Thus, the considered selling and buying price of pool is $\lambda_t^{pSell} = \hat{\lambda}_t + NC$ and $\lambda_t^{pBuy} = \hat{\lambda}_t - NC$ respectively. The net revenue $r^p$ from trading within the pool is shown in equation (13) below:

$$\sum_{t \in T} \lambda_t^{pSell} \left( \sum_{s \in S} b_{t,s}^{pSell} + g_{t,s}^{pSell} \right) \delta t - \quad (13)$$
$$\sum_{t \in T} \lambda_t^{pBuy} \left( \sum_{s \in S} b_{t,s}^{pBuy} + d_{t,s}^{pBuy} \right) \delta t$$

In an embodiment, the objective function is represented as: max $r^m + r^p - \Sigma_{s \in S}(c_s^{Gen} - c_s^{deg})$, where $r^m$ represents revenue earned by an aggregator from a volume traded in market over an entire day, $r^p$ represents net revenue from trading within the pool, $c_s^{Gen}$ represents cost of generation and $c_s^{deg}$ represents degradation cost associated with a distributed energy resource (DER) assets from the plurality of distributed energy resource (DER) assets of a subscriber s from the one or more subscribers S. Power generation from the solar incurs a cost which typically can be calculated as levelized cost. The depreciation of battery's health is quantified using degradation cost as shown in equation (14) below.

$$c_s^{deg} = \gamma \frac{c_s^{inv}}{Cap_s} \sum_{t \in T} \left( b_{t,s}^{mBuy} + b_{t,s}^{mSell} + b_{t,s}^{pBuy} + b_{t,s}^{pSell} \right) \quad (14)$$

Here $\gamma$ represents linear approximation of the slope of degradation curve in terms of number of life-cycles and operation hours. $C_s^{inv}$ represents investment of battery while $Cap_s$ represents battery capacity. The optimization with the objective function and a set of linear constraints shown in equations (1) through (13) is a Mixed Integer Linear Programming (MILP) problem.

Further, at step 206 of the resent disclosure, the one or more hardware processors 104 are configured to compute a flexibility index to quantify a flexibility offered by each of the plurality of distributed energy resource (DER) assets to an aggregator. The flexibility index represents a total flexible volume ($v_s^{flex}$) offered by each of the plurality of distributed energy resource (DER) assets to the aggregator that is controlled to maximize the aggregator profit.

In an embodiment, it is assumed that $\Pi_A$ represents total profit earned by the aggregator when all subscribers participate as a single group as per the market participation and der scheduling optimization model. Similarly, $\Pi_s$ represents the profit earned by subscriber s if it trades with the market individually. Now, the surplus profit earned due to aggregation can be calculated as shown in equation (15) below:

$$\Pi_A^+ = \Pi_A - \sum_{s \in S} \Pi_s \quad (15)$$

If $\Pi_A^+ > 0$, then there is an additional value created due to aggregation. In this case, there is economic rationale for the individual DERs to stay together as a group. On the other hand, if $\Pi_A^+ < 0$, there is no economic value created by aggregation. A profit allocation mechanism should be equitable, fair, and simple. Another desired property is that each member receives a pay-out that is at least the profit that would be obtained if it participates individually ensuring that no member is at loss when participating in a group. Based on the above guidelines, a proportionality based allocation mechanism based on flexibility index of DER assets is describe in the present disclosure. Thus, the flexibility index FlexI of a subscriber s is defined based on the total flexible volume $v_s^{flex}$ offered by it to the aggregator which can be controlled/scheduled to maximize its profit. In the present disclosure, the flexible volume of three DERs type including flexible volume offered by battery, shiftability in demand, and captive generation through solar is considered. The flexibility of a battery is considered as the total volume it offers to the aggregator for trading in the entire day and calculated as $b_s^{flex} = \Sigma_{t \in T} a_{t,s}^b R_s^{max}$. The flexibility of demand is the total variable/flexible load offered $d_s^{flex} = D^{totflex}$ over the day. The flexibility of solar is its total generated volume. More formally, $g_s^{flex} = \Sigma_{t \in T} Gen_{t,s}$. In an embodiment, the total flexible volume ($v_s^{flex}$) is represented as: $v_s^{flex} = w_b b_s^{flex} + w_d d_s^{flex} + w_g g_s^{flex}$, $\forall s \in S$, where $w_x$ is a weight associated with a flexibility component x such that $0 \leq w_x \leq 1$ and $\Sigma_x w_x = 1$ with $x \in \{w_b, w_d, w_g\}$. Here, b denotes battery, d denotes demand, and g denotes solar. $v_s^{flex}$ represents flexibility of a battery, $d_s^{flex}$ represents flexibility of demand, and $g_s^{flex}$ represents flexibility of solar. $v_s^{flex}$ is converted into per unit (pu) value by normalizing it over a base flexible volume $v_{base}^{flex}$ calculated as shown in equation (16) below:

$$v_{base}^{flex} = w_b \max_{s \in S}(b_s^{flex}) + w_d \max_{s \in S}(d_s^{flex}) + w_g \max_{s \in S}(g_s^{flex}) \quad (18)$$

This results in the flexible index denote by $f_s$ to be on same scale of (0,1) for all subscribers as shown in equation (17) below:

$$f_s = \frac{v_s^{flex}}{v_{base}^{flex}} \quad (17)$$

Referring to FIG. 2, at step 208 of the present disclosure, the one or more hardware processors 104 are configured to allocate the optimal value of aggregator profit to the one or more subscribers S based on the computed flexibility index. The optimal value of allocated aggregator profit is represented as $$\prod_s^{alloc} = \prod_s + \frac{f_s}{\sum_{s \in S} f_s} \prod_A^+,$$

where $\Pi_s$ represents profit earned by the subscriber s from the one or more subscribers S while trading with the market individually, $f_s$ represents the flexibility index, and $\Pi_A^+$ represents surplus profit earned due to aggregation. This allocation ensures at least the individual profit. From the above flexibility definition, it is clear that subscribers with higher flexible volume earn higher profits. This kind of allocation encourages subscribers to offer maximum flexibility within their capacity.

In an embodiment, to better understand the efficacy and nuances of the method of the present disclosure, a case study for a set of 10 subscribers is presented. Table 1 below provides specifications of single or multiple DER assets of each subscriber.

TABLE 1

| Subscriber | Battery Capacity (MWh) | Battery Pmax (MW/hr) | Solar Panel Capacity (MW) | Fixed load (MW) | Flexible load (MW) |
|---|---|---|---|---|---|
| 1 | 3.50 | 0.95 | — | — | — |
| 2 | 5.50 | 1.48 | — | — | — |
| 3 | 6.00 | 1.60 | — | 1.60 | 1.12 |
| 4 | 12.00 | 3.20 | — | 2.72 | 0.27 |
| 5 | — | — | — | 2.37 | 2.37 |
| 6 | — | — | — | 1.5 | 13.47 |
| 7 | — | — | — | 0.68 | 14.31 |
| 8 | — | — | 4.00 | — | — |
| 9 | 2.8 | 0.95 | 3.00 | — | — |
| 10 | — | — | 2.5 | — | — |

The SoC of each battery system is set to vary between a minimum of 20% and a maximum of 90% of the total battery capacity. The charging and discharging efficiency of each battery is set at 95%. Real world price data of a known in the art PJM day-ahead market is used. The profit allocation model of the present disclosure is compared with a marginal contribution based allocation model. These two allocation models are compared based on the surplus profit allocated to the individual subscribers and their computation complexity over a simulation duration of a month (30 days). In marginal contribution based allocation, the subscriber is rewarded in proportion to its actual monetary contribution to the net aggregator profit. If $\Pi_{A_{(s-x)}}$ denotes the profit earned by the aggregator without the participation of subscriber $x \in S$, then the marginal contribution of this subscriber, $\Pi_x^{mc}$, is given by $\Pi_x^{mc} = \Pi_A - \Pi_{A_{(s-x)}}$. Under this marginal contribution method, aggregator first determines the amount each subscriber s may earn if it participates in the market individually ($\Pi_s$). It then finds out the marginal contribution of every subscriber $\Pi_s^{mc}$. The value of $\Pi_s^{mc}$ is then normalized ($\widehat{\Pi_s^{mc}}$) to be in the range of (0, 1). Subscribers may have negative or positive marginal contribution depending on their net demand or generation respectively. Normalization is required in order to bring the marginal contribution of all the subscriber to a common scale. The profit allocated to a subscriber s is then calculated as shown in equation (18) below:

$$\prod_s^{alloc} = \prod_s + \frac{\widehat{\Pi_s^{mc}}}{\sum_{s \in S} \widehat{\Pi_s^{mc}}} \prod_A^+ \qquad (18)$$

Experimental Results

Figure 4A:
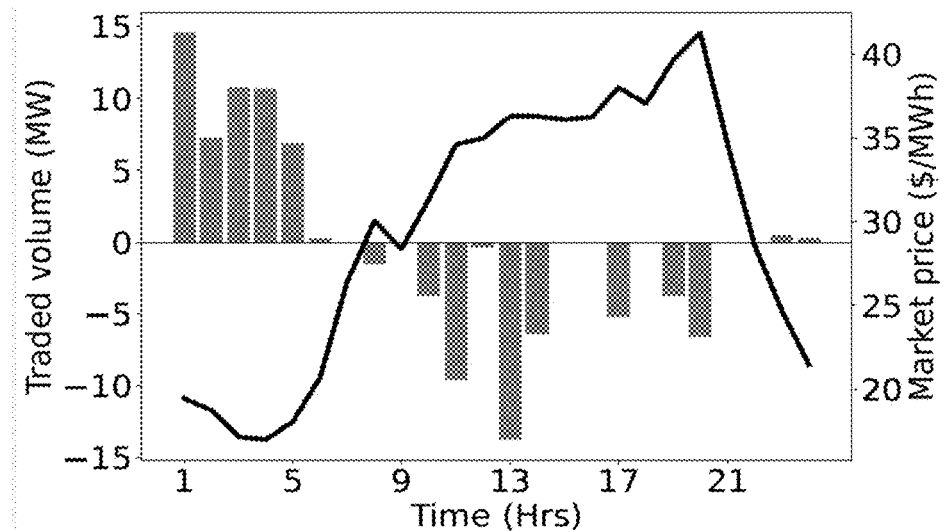
FIGS. 4A and 4B depict graphical plots illustrating day-ahead market trading for a simulation day with and without energy sharing respectively, in accordance with some embodiments of the present disclosure.
Figure 4B:
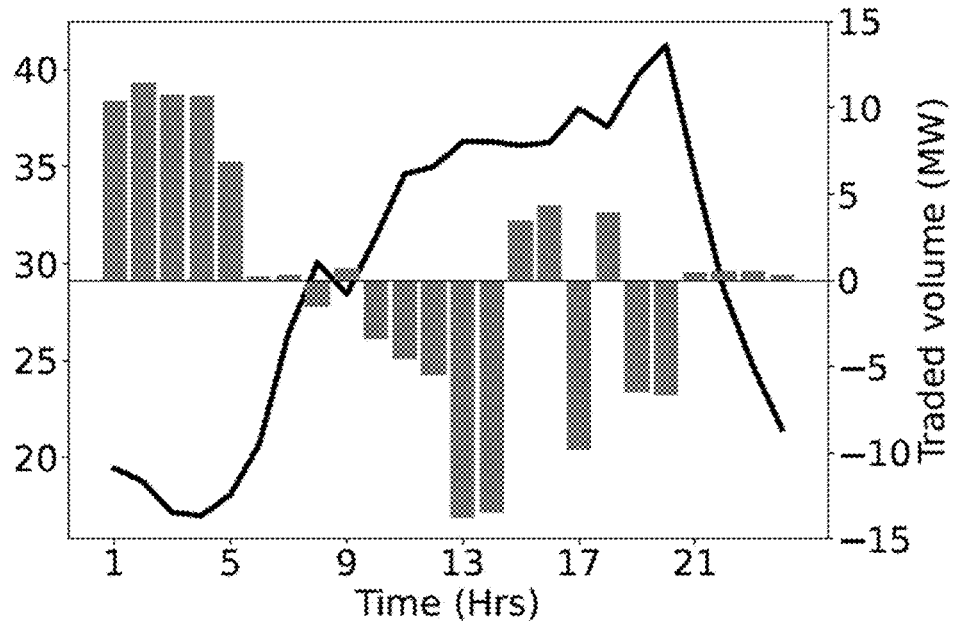
Figure 5:
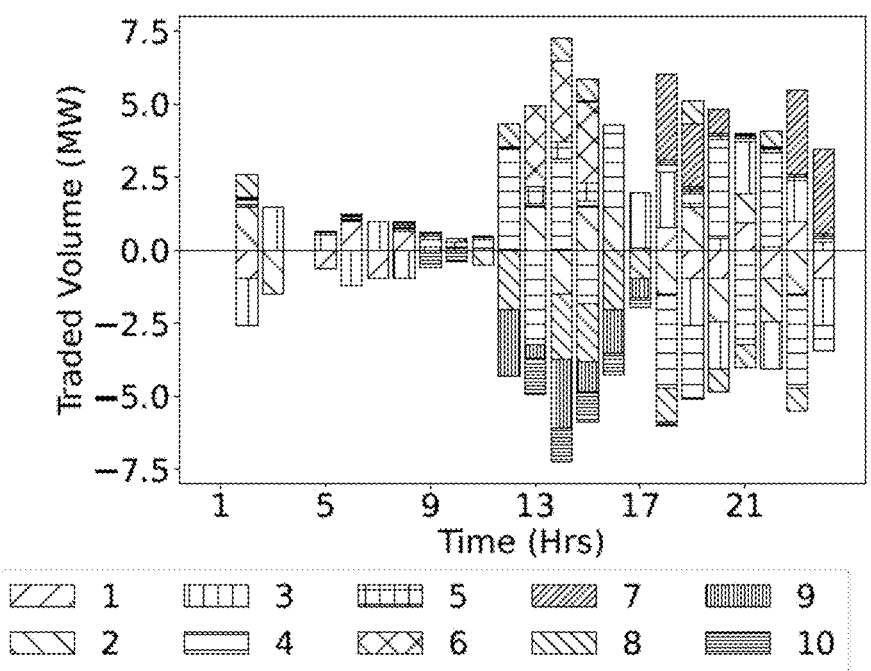
FIG. 5 depicts a graphical plot illustrating energy sharing between subscribers within the pool for the simulation day, in accordance with some embodiments of the present disclosure.
Figure 6:
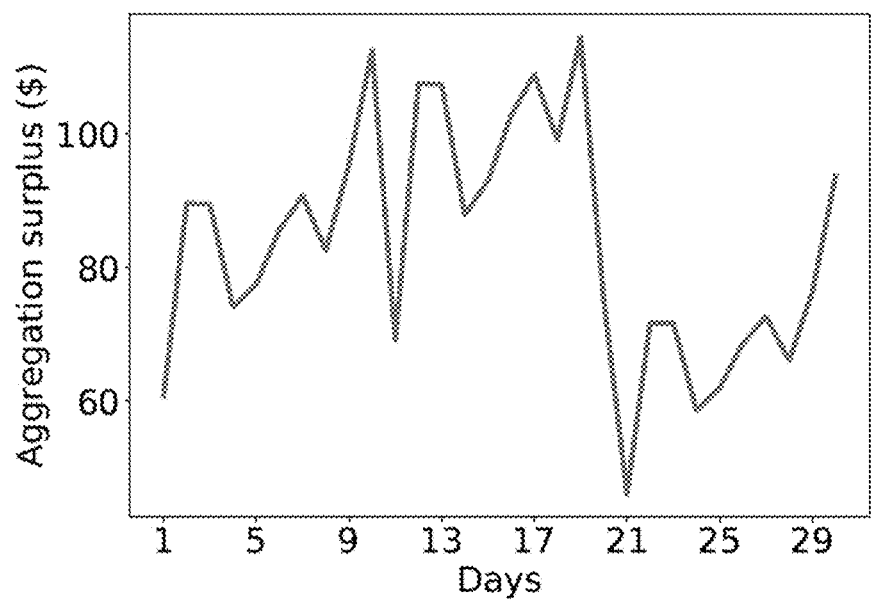
FIG. 6 depicts a graphical plot illustrating the aggregation surplus earned by the aggregator over an entire simulation duration of a month in accordance with some embodiments of the present disclosure.

In an embodiment, results of the aggregator model are described which are better understood by results of one simulation day. FIGS. 4A and 4B depict graphical plots illustrating day-ahead market trading for the considered simulation day with and without energy sharing respectively, in accordance with some embodiments of the present disclosure. FIG. 4A depicts a graphical plot illustrating net volume traded by the aggregator in day-ahead market for the considered simulation day with and without energy sharing respectively, in accordance with some embodiments of the present disclosure. The positive volume in the plot of FIG. 4A represents schedule for buying from day-ahead market while negative volume indicates selling in market. To maximize its profit, it can be seen that the aggregator buys when prices are low and sells when prices are comparatively high. FIG. 4B depicts a graphical plot illustrating the net volume traded with day-ahead market if energy sharing between subscribers is not modeled, in accordance with some embodiments of the present disclosure. The aggregation of DER assets with energy sharing within pool leads to a surplus of $114. This aggregation surplus with energy sharing within pool is not just because of inclusion of pool prices but also due to differences in the output schedules as seen from FIGS. 4A and 4B. FIG. 5 depicts a graphical plot illustrating energy sharing between subscribers within the pool for the simulation day, in accordance with some embodiments of the present disclosure. It is observed that subscribers with battery actively participate in energy sharing within the pool (both buy and sell). Subscribers with solar sell within the pool while those with load buy from it. FIG. 6 depicts a graphical plot illustrating the aggregation surplus earned by the aggregator over an entire simulation duration of a month, in accordance with some embodiments of the present disclosure. The aggregation always earns surplus value because of energy sharing between its DER assets. There is a daily average profit gain of 32% due to energy sharing modeling. In the presents disclosure, network charges (NC), are considered as 5% of $\hat{i}^{da}$. The impact of non-zero (NC) on aggregation surplus and the schedule with trading within the pool is also examined. It is found that higher NC results in increased surplus. However, the output schedule does not vary with respect to change in the NC.

In an embodiment, results of the profit allocation model are described.

1. Flexibility of subscribers: Table 2 below provides the flexibility indices $f_s$ obtained by using equal weights for all the flexibility dimensions, (i.e., $w_b = w_d = w_g = 0.33$) for a given simulation day.

TABLE 2

| Sub | $B_s^{flex}$ (MW) | $G^{flex}$ (MW) | $D^{flex}$ (MW) | $p^{flex}$ (MW) | $F_s$ |
|---|---|---|---|---|---|
| 1 | 18.21 | 0.00 | 0.00 | 18.21 | 0.20 |
| 2 | 26.73 | 0.00 | 0.00 | 26.73 | 0.29 |
| 3 | 29.16 | 0.00 | 1.12 | 30.28 | 0.33 |
| 4 | 58.32 | 0.00 | 0.27 | 58.59 | 0.64 |
| 5 | 0.00 | 0.00 | 2.37 | 2.37 | 0.02 |
| 6 | 0.00 | 0.00 | 13.47 | 13.47 | 0.14 |
| 7 | 0.00 | 0.00 | 14.31 | 14.31 | 0.15 |
| 8 | 13.8 | 13.73 | 0.00 | 27.53 | 0.30 |
| 9 | 0.00 | 17.83 | 0.00 | 17.83 | 0.19 |
| 10 | 0.00 | 8.91 | 0.00 | 8.91 | 0.09 |

By comparing these with the subscriber characteristics, following is gathered:

a. The flexibility indices are intuitive—for a given subscriber, the value increases with capacity, power rating, and quantum of time shiftability of respective DER assets. Therefore, this metric can be a reasonable choice to apportion the profit earned by the aggregator amongst the subscribers which means such an apportioning can be easily understood by the subscribers).

b. Since the flexibility values are on the same scale, the flexibility offered along different dimensions by different types of DER assets can also be compared, and c. If the aggregator desires so, the weights assigned to the various flexibility dimensions can be changed to promote the penetration of certain flexibility dimension in its subscriber community.

Figure 7:
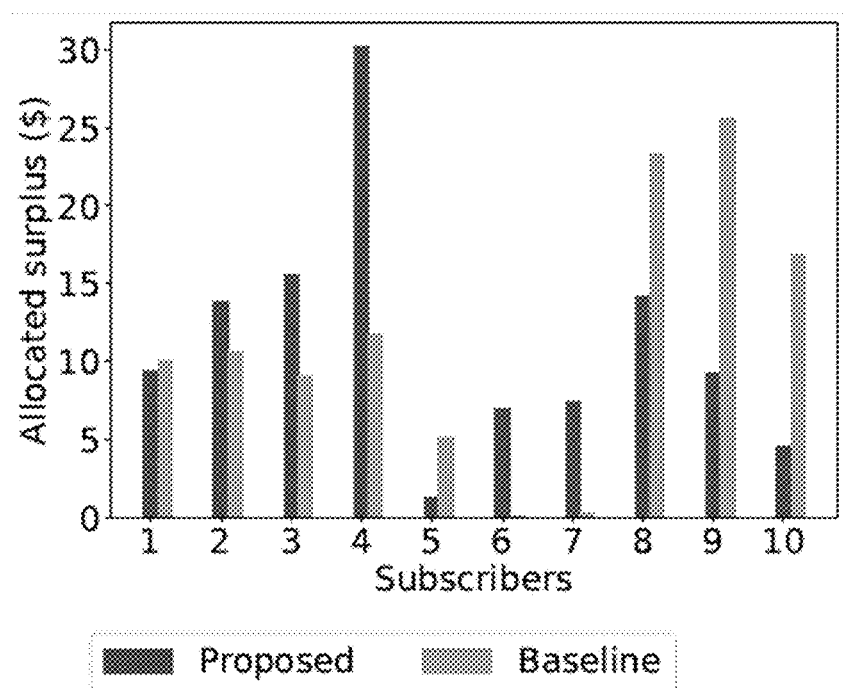
FIG. 7 depicts a graphical plot illustrating comparison of the surplus allocations made to the subscribers on the simulation day under the two techniques, in accordance with some embodiments of the present disclosure.

2. Profit Allocation: The two profit allocation techniques differ in the way in which the aggregation surplus is distributed among the subscribers. FIG. 7 depicts a graphical plot illustrating comparison of the surplus allocations made to the subscribers on the simulation day under the two techniques, in accordance with some embodiments of the present disclosure. From FIG. 7, following is observed:

a. The allocations made to various subscribers under the two methods is not the same. This implies that having a subscriber with a high flexibility metric does not necessitate that its marginal contribution will be high.

b. For subscribers with battery, baseline allocates as per the profits created by each. However, the proposed flexibility technique favors them who offer higher $B^{flex}$.

c. When a comparison with subscribers with solar is done, the baseline allocates substantial surplus to all while the method of the present disclosure allocates more to those with battery, as it offers higher flexible volume with both solar and battery, and d. For subscribers with only demand, the baseline seems to prefer those with least total load requirement as they incur the least cost. However, the method of the present disclosure allocates surplus based on volume of flexible load, irrespective of the quantity of total load.

Figure 8A:
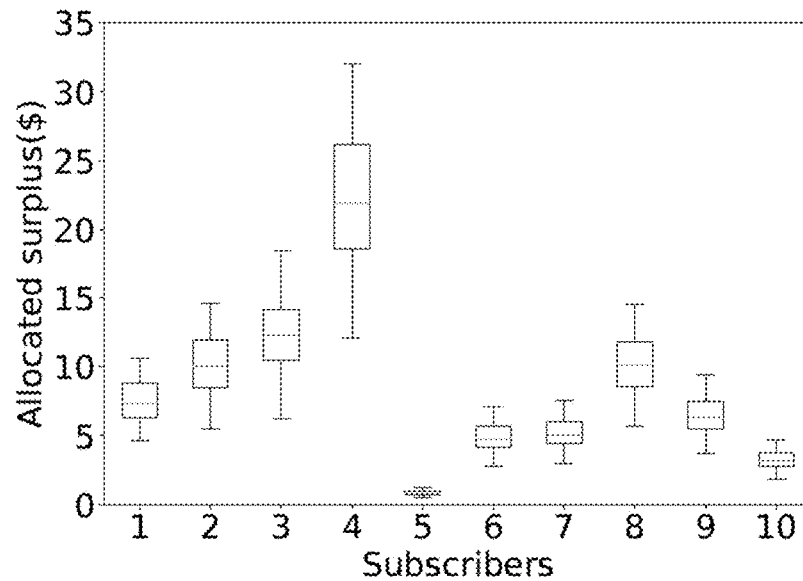
FIGS. 8A and 8B depict graphical plots illustrating a comparison of allocation ratios across simulation duration for under the two techniques, in accordance with some embodiments of the present disclosure.
Figure 8B:
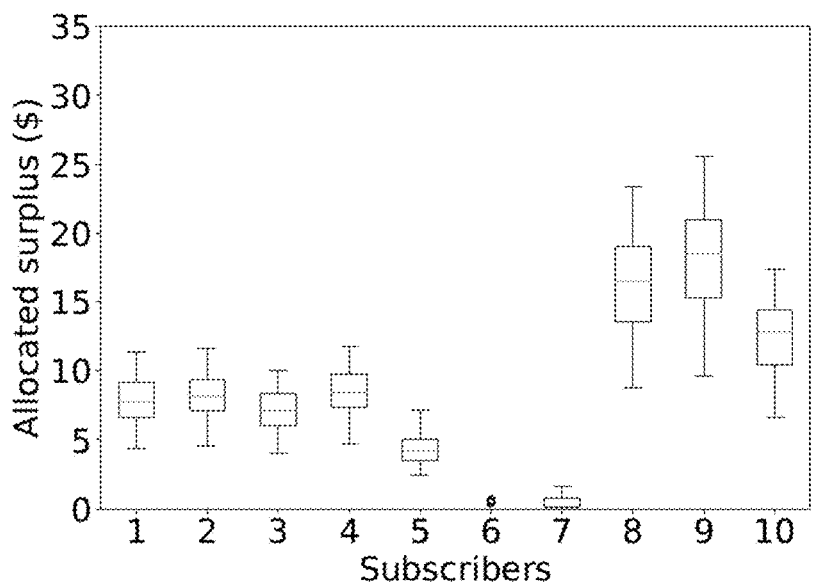

It is to be noted that the surplus value $\Pi_A^+$ depends on the values of $\lambda_t^{pBuy}$ and $\lambda_p^{Sell}$ chosen by the aggregator. Nevertheless, the profit allocation method is applicable to any choice of pool prices as it is independent of the numerical value of $\Pi_A^+$. FIGS. 8A and 8B depict graphical plots illustrating a comparison of allocation ratios across simulation duration for under the two techniques, in accordance with some embodiments of the present disclosure. The availability of batteries ($a_{t,s}^b$) and slots of flexible demand ($a_{t,s}^d$) changes each day which means that the flexibility offered by these assets varies over the month while the flexible volume offered by solar depends on weather. It is observed that the method of the present disclosure shows a higher variation in the day-to-day surplus allocation ratio for most of subscribers in comparison to the baseline method. Allocation under the method of the present disclosure is affected by the flexibility which can be altered by a subscriber. However, allocation under the baseline scheme is mainly a function of day-ahead market behavior (because of its monetary focus) which is difficult to predict. Even though a subscriber trades more, it might not earn more. Such allocation is not preferred since it makes it difficult for the subscribers to understand under what circumstances they will be "rewarded" or "preferred" by the aggregator. Consequently, the subscribers may not make an effort to increase the behavioral/flexibility traits that may help the power system.

Coalition stability: A coalition of subscribers is said to be stable if its overall value is greater than the sum of subscriber values when acting individually. Formally, in terms of the notations defined earlier, a stable coalition is observed if $\Pi_A^+>0$. With the subscriber set, it is found that for the simulation day, $\Pi_A=\$1040$ while $\Sigma_{s \in S}\Pi_s=\$926$ which indicates that the subscriber set is a stable coalition and thus each subscriber earn some surplus value.

Computational complexity: For a set with n subscribers, under the baseline method, the aggregator needs to solve (2n+1) optimization problems to determine the allocations of its subscribers. However, under the method of the present disclosure, the aggregator needs to run only (n+1) optimization problems which leads to roughly 50% reduction in the computation efforts. These computational savings are considerable especially when there are hundreds of DERs and dozens of transactions encompassing all the DERs have to be completed in a day.

Embodiments of the present disclosure present an optimization model for an aggregator to interact with day-ahead markets which encourages energy sharing within its DER assets. The aggregation method of the present disclosure increases gained profit by 32% on an average for a day with respect to profit earned without energy sharing exchanges. In the present disclosure, a definition for flexibility provided by a subscriber in an aggregation is also provided. A profit allocation model based on the flexibility definition is described. A comparison between the flexibility based allocation method of the present disclosure and a baseline method highlights its advantages of transparency and ease of computation over the latter.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein by the following claims.

What is claimed is:

1. A processor implemented method, comprising:
    inputting, via one or more hardware processors, (i) a first set of information pertaining to a plurality of distributed energy resource (DER) assets of one or more subscribers S, and (ii) a second set of information related to trading and allocation to an aggregator model;
    determining, via the one or more hardware processors, an optimal value of an aggregator profit in accordance with an objective function of the aggregator model such that an energy sharing by the plurality of distributed energy resource (DER) assets within a pool of the aggregator model is ensured;
    computing, via the one or more hardware processors, a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and
    allocating, via the one or more hardware processors, the optimal value of aggregator profit to the one or more subscribers Sbased on the computed flexibility index.

2. The processor implemented method of claim 1, wherein the objective function is represented as: max $r^m + r^p - \Sigma_{s \in S}(c_s^{Gen} - c_s^{deg})$, where $r^m$ represents revenue earned by the aggregator from a volume traded in market over an entire day, $r^p$ represents net revenue from trading within the pool, $c_s^{Gen}$ represents cost of generation and $c_s^{deg}$ represents degradation cost associated with a distributed energy resource (DER) assets from the plurality of distributed energy resource (DER) assets of a subscriber s from the one or more subscribers S.

3. The processor implemented method of claim 1, wherein the total flexible volume ($v_s^{flex}$) is represented as: $v_s^{flex} = w_b b_s^{flex} + w_d d_s^{flex} + w_g g_s^{flex}$, $\forall s \in S$, where where $w_x$ is a weight associated with a flexibility component x such that $0 \leq w_x \leq 1$ and $\Sigma_x w_x = 1$ with $x \in \{w_b, w_d, w_g\}$, where $v_s^{flex}$ represents flexibility of a battery, $d_s^{flex}$ represents flexibility of demand, and $g_s^{flex}$ represents flexibility of solar.

4. The processor implemented method of claim 1, wherein the optimal value of allocated aggregator profit is represented as:

$$\prod_s^{alloc} = \prod_s + \frac{f_s}{\sum_{s \in S} f_s} \prod_A^+,$$

where $\Pi_s$ represents profit earned by the subscriber s from the one or more subscribers S while trading with the market individually, $f_s$ represents the flexibility index, and $\Pi_A^+$ represents surplus profit earned due to aggregation.

5. A system, comprising:
    a memory storing instructions;
    one or more communication interfaces; and
    one or more hardware processors coupled to the memory via the one or more communication interfaces, wherein the one or more hardware processors are configured by the instructions to:

input (i) a first set of information pertaining to a plurality of distributed energy resource (DER) assets of one or more subscribers S, and (ii) a second set of information related to trading and allocation to an aggregator model;

determine an optimal value of an aggregator profit in accordance with an objective function of the aggregator model such that an energy sharing by the plurality of distributed energy resource (DER) assets within a pool of the aggregator model is ensured;

compute a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and allocate the optimal value of aggregator profit to the one or more subscribers S based on the computed flexibility index.

6. The system of claim 5, wherein the objective function is represented as: max $r^m+r^p-\Sigma_{s\in S}(s_s^{Gen}-c_s^{deg})$, where $r^m$ represents revenue earned by the aggregator from a volume traded in market over an entire day, $r^p$ represents net revenue from trading within the pool, $c_s^{Gen}$ represents cost of generation and $c_s^{deg}$ represents degradation cost associated with a distributed energy resource (DER) assets from the plurality of distributed energy resource (DER) assets of a subscriber s from the one or more subscribers S.

7. The system of claim 5, wherein the total flexible volume ($v_s^{flex}$) is represented as: $v_s^{flex}=w_b b_s^{flex}+w_d d_s^{flex}+w_g g_s^{flex}$, $\forall s \in S$, where $w_x$ is a weight associated with a flexibility component x such that $0 \leq w_x \leq 1$ and $\Sigma_x w_x=1$ with $x \in \{w_b, w_d, w_g\}$, where $v_s^{flex}$ represents flexibility of a battery, $d_s^{flex}$ represents flexibility of demand, and $g_s^{flex}$ represents flexibility of solar.

8. The system of claim 5, wherein the optimal value of allocated aggregator profit is represented as:

$$\prod_s^{alloc} = \prod_s + \frac{f_s}{\sum_{s \in S} f_s} \prod_A^+,$$

where $\Pi_s$ represents profit earned by the subscriber s from the one or more subscribers S while trading with the market individually, $f_s$ represents the flexibility index, and $\Pi_A^+$ represents surplus profit earned due to aggregation.

9. One or more non-transitory machine-readable information storage mediums comprising one or more instructions which when executed by one or more hardware processors cause:

inputting (i) a first set of information pertaining to a plurality of distributed energy resource (DER) assets of one or more subscribers S, and (ii) a second set of information related to trading and allocation to an aggregator model;

determining an optimal value of an aggregator profit in accordance with an objective function of the aggregator model such that an energy sharing by the plurality of distributed energy resource (DER) assets within a pool of the aggregator model is ensured;

computing a flexibility index to quantify a flexibility offered by each of the plurality of distributed energy resource (DER) assets to an aggregator, wherein the flexibility index represents a total flexible volume ($v_s^{flex}$) offered by each of the plurality of distributed energy resource (DER) assets to the aggregator that is controlled to maximize the aggregator profit; and allocating the optimal value of aggregator profit to the one or more subscribers S based on the computed flexibility index.

10. The one or more non-transitory machine-readable information storage mediums of claim 9, wherein the objective function is represented as: max $r^m+r^p-\Sigma_{s\in S}(c_s^{Gen}-c_s^{deg})$, where $r^m$ represents revenue earned by the aggregator from a volume traded in market over an entire day, $r^p$ represents net revenue from trading within the pool, $c_s^{Gen}$ represents cost of generation and $c_s^{deg}$ represents degradation cost associated with a distributed energy resource (DER) assets from the plurality of distributed energy resource (DER) assets of a subscriber s from the one or more subscribers S.

11. The one or more non-transitory machine-readable information storage mediums of claim 9, wherein the total flexible volume ($v_s^{flex}$) is represented as: $v_s^{flex}=w_b b_s^{flex}+w_d d_s^{flex}+w_g g_s^{flex}$, $\forall s \in S$, where $w_x$ is a weight associated with a flexibility component x such that $0 \leq w_x \leq 1$ and $\Sigma_x w_x=1$ with $x \in \{w_b w_d w_g\}$, where $v_s^{flex}$ represents flexibility of a battery, $d_s^{flex}$ represents flexibility of demand, and $g_s^{flex}$ represents flexibility of solar.

12. The one or more non-transitory machine-readable information storage mediums of claim 9, wherein the optimal value of allocated aggregator profit is represented as:

$$\prod_s^{alloc} = \prod_s + \frac{f_s}{\sum_{s \in S} f_s} \prod_A^+,$$

where $\Pi_s$ represents profit earned by the subscriber s from the one or more subscribers S while trading with the market individually, $f_s$ represents the flexibility index, and $\Pi_A^+$ represents surplus profit earned due to aggregation.

* * * * *